United States Patent [19]

Schilling

[11] Patent Number: 5,299,226

[45] Date of Patent: *Mar. 29, 1994

[54] ADAPTIVE POWER CONTROL FOR A SPREAD SPECTRUM COMMUNICATIONS SYSTEM AND METHOD

[75] Inventor: Donald L. Schilling, Sands Point, N.Y.

[73] Assignee: InterDigital Technology Corporation, Wilmington, Del.

[*] Notice: The portion of the term of this patent subsequent to Mar. 3, 2009 has been disclaimed.

[21] Appl. No.: 792,869

[22] Filed: Nov. 19, 1991

Related U.S. Application Data

[63] Continuation-in-part of Ser. No. 614,816, Nov. 16, 1990, Pat. No. 5,093,840.

[51] Int. Cl.⁵ ............................................. H04K 1/00
[52] U.S. Cl. ........................................ 375/1; 380/34
[58] Field of Search ................ 380/34, 39, 40; 375/1, 375/102; 455/33.1, 59, 61, 103, 191, 212, 213, 224, 225; 379/59, 63

[56] References Cited

U.S. PATENT DOCUMENTS

| | | |
|---|---|---|
| 3,831,013 | 8/1974 | Alsup et al. . |
| 3,838,342 | 9/1974 | Bjorkman . |
| 3,900,721 | 8/1975 | Speiser et al. . |
| 4,112,372 | 9/1978 | Holmes et al. . |
| 4,189,677 | 2/1980 | Cooper et al. . |
| 4,222,115 | 9/1980 | Cooper et al. ............ 375/1 |
| 4,238,850 | 12/1980 | Vance . |
| 4,247,942 | 1/1981 | Hauer . |
| 4,285,060 | 8/1981 | Cobb et al. . |
| 4,392,232 | 7/1983 | Andren et al. . |
| 4,418,393 | 11/1983 | Zscheile, Jr. . |
| 4,418,425 | 11/1983 | Fennel, Jr. et al. . |
| 4,425,642 | 1/1984 | Moses et al. . |
| 4,455,651 | 6/1984 | Baran . |
| 4,479,226 | 10/1984 | Prabhu et al. . |
| 4,512,013 | 4/1985 | Nash et al. . |
| 4,523,311 | 6/1985 | Lee et al. . |
| 4,538,280 | 8/1985 | Mosley, Jr. et al. . |
| 4,553,130 | 11/1985 | Kato . |
| 4,563,774 | 1/1986 | Gloge . |
| 4,606,039 | 8/1986 | Nicolas et al. . |
| 4,612,637 | 9/1986 | Davis et al. . |
| 4,621,365 | 11/1986 | Chiu . |
| 4,647,863 | 3/1987 | Skudera, Jr. et al. . |
| 4,649,549 | 3/1987 | Halpern et al. . |
| 4,653,069 | 3/1987 | Roeder . |
| 4,660,164 | 4/1987 | Leibowitz . |

(List continued on next page.)

FOREIGN PATENT DOCUMENTS 2229609 9/1990 United Kingdom .

OTHER PUBLICATIONS

R. F. Ormondroyd, "Power Control For Spread-Spectrum Systems", Conference on Communications Equipment and Systems. Apr. 20-22 1982. pp. 109-115.

8049 IEEE Proceedings, section A-K, vol. 129, Jun. 1982, No. 3, Part F, Old Woking, Surrey, Great Britain.

Primary Examiner—Tod R. Swann
Attorney, Agent, or Firm—David Newman & Associates

[57] ABSTRACT

An apparatus for adaptive-power control of a spread-spectrum transmitter of a mobile station operating in a cellular-communications network using spread-spectrum modulation. A base station transmits a first spread-spectrum signal. A mobile station has an automatic-gain-control circuit for generating an AGC-output signal, from a received signal. The received signal includes the first spread-spectrum signal and an interfering signal. The mobile station also has a correlator for despreading the AGC-output signal, a power-measurement circuit responsive to processing the received signal with the despread AGC-output signal for generating a received-power level, a comparator coupled to the power-measurement circuit for generating a comparison signal by comparing the received-power level to a threshold level, a transmitter for transmitting a second spread-spectrum signal, an antenna, and a variable-gain device responsive to the comparison signal for adjusting a transmitter-power level of the second spread-spectrum signal.

8 Claims, 6 Drawing Sheets

U.S. PATENT DOCUMENTS

| | | |
|---|---|---|
| 4,672,605 | 6/1987 | Hustig et al. . |
| 4,672,629 | 6/1987 | Beier . |
| 4,672,658 | 6/1987 | Kavehrad et al. . |
| 4,675,839 | 6/1987 | Kerr . |
| 4,680,785 | 7/1987 | Akiyama et al. . |
| 4,691,326 | 9/1987 | Tsuchiya . |
| 4,697,260 | 9/1987 | Grauel et al. . |
| 4,703,474 | 10/1987 | Foschini et al. . |
| 4,707,839 | 11/1987 | Andren et al. . |
| 4,718,080 | 1/1988 | Serrano et al. . |
| 4,730,340 | 3/1988 | Frazier, Jr. . |
| 4,742,512 | 5/1988 | Akashi et al. . |
| 4,755,983 | 7/1988 | Masak et al. . |
| 4,759,034 | 7/1988 | Nagazumi . |
| 4,789,983 | 12/1988 | Acampora et al. . |
| 4,799,253 | 1/1989 | Stern et al. . |
| 4,805,208 | 2/1989 | Schwartz . |
| 4,807,222 | 2/1989 | Amitay . |
| 4,837,802 | 6/1989 | Higashiyama et al. . |
| 4,850,036 | 7/1989 | Smith . |
| 4,860,307 | 8/1989 | Nakayama . |
| 4,866,732 | 9/1989 | Carey et al. . |
| 4,894,842 | 1/1990 | Broekhoven et al. . |
| 4,899,364 | 2/1990 | Akazawa et al. ......................... 375/1 |
| 4,901,307 | 2/1990 | Gilhousen et al. ..................... 370/18 |
| 4,914,651 | 4/1990 | Lusignan . |
| 4,922,506 | 5/1990 | McCallister et al. . |
| 4,930,140 | 5/1990 | Cripps et al. . |
| 4,932,037 | 6/1990 | Simpson et al. . |
| 4,958,359 | 9/1990 | Kato . |
| 4,969,159 | 11/1990 | Belcher et al. . |
| 4,977,577 | 12/1990 | Arthur et al. . |
| 4,977,578 | 12/1990 | Ishigaki et al. . |
| 5,005,169 | 4/1991 | Bronder et al. . |
| 5,016,255 | 5/1991 | Dixon et al. . |
| 5,016,256 | 5/1991 | Stewart . |
| 5,022,047 | 6/1991 | Dixon et al. . |
| 5,023,887 | 6/1991 | Takeuchi et al. . |
| 5,029,181 | 7/1991 | Endo et al. . |
| 5,040,238 | 8/1991 | Comroe et al. . |
| 5,048,052 | 9/1991 | Hamatsu et al. . |
| 5,056,109 | 10/1991 | Gilhousen et al. . |
| 5,101,501 | 3/1992 | Gilhousen et al. . |
| 5,103,459 | 4/1992 | Gilhousen et al. ..................... 375/1 |
| 5,109,390 | 4/1992 | Gilhousen et al. ..................... 375/1 |

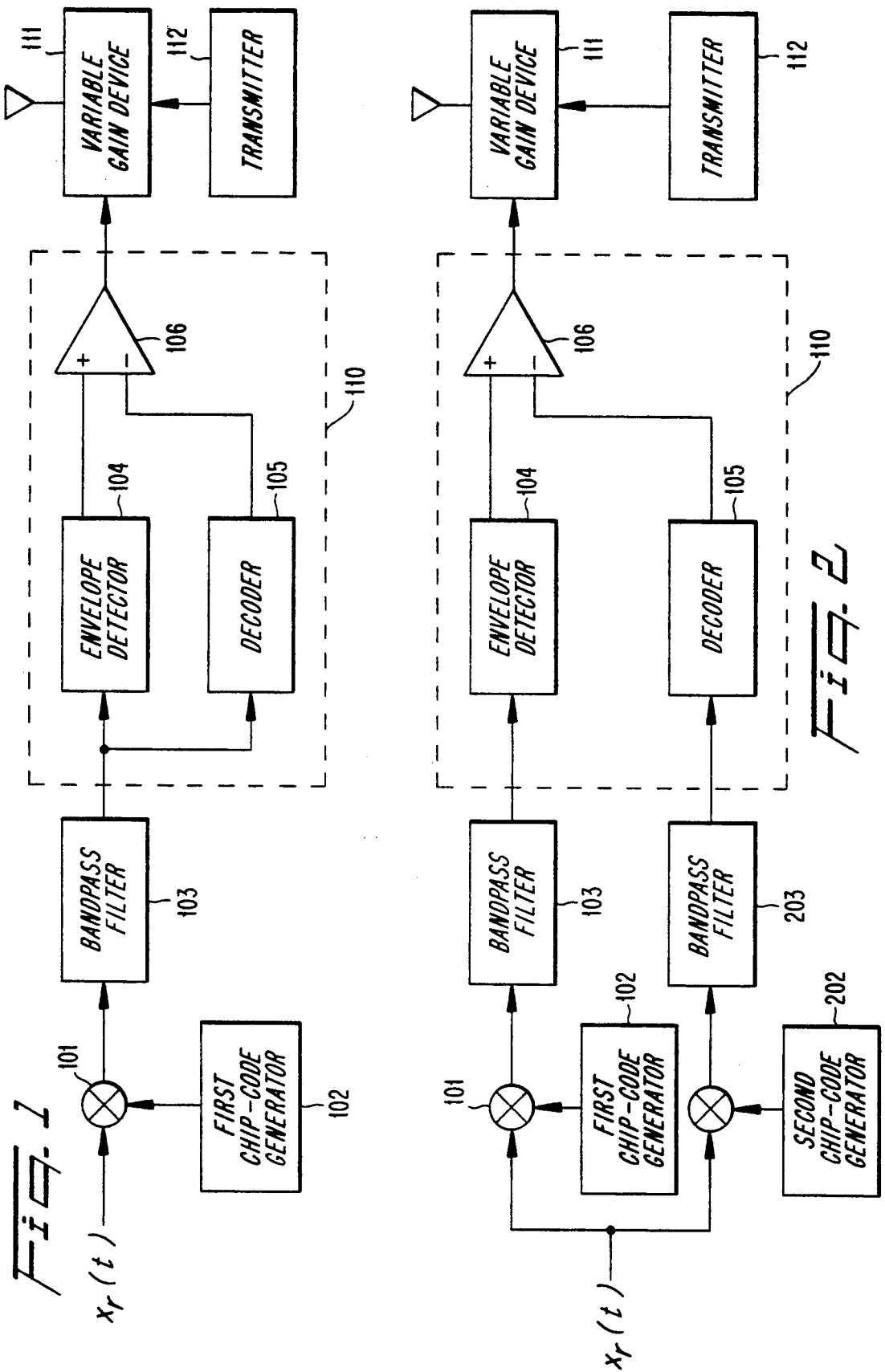

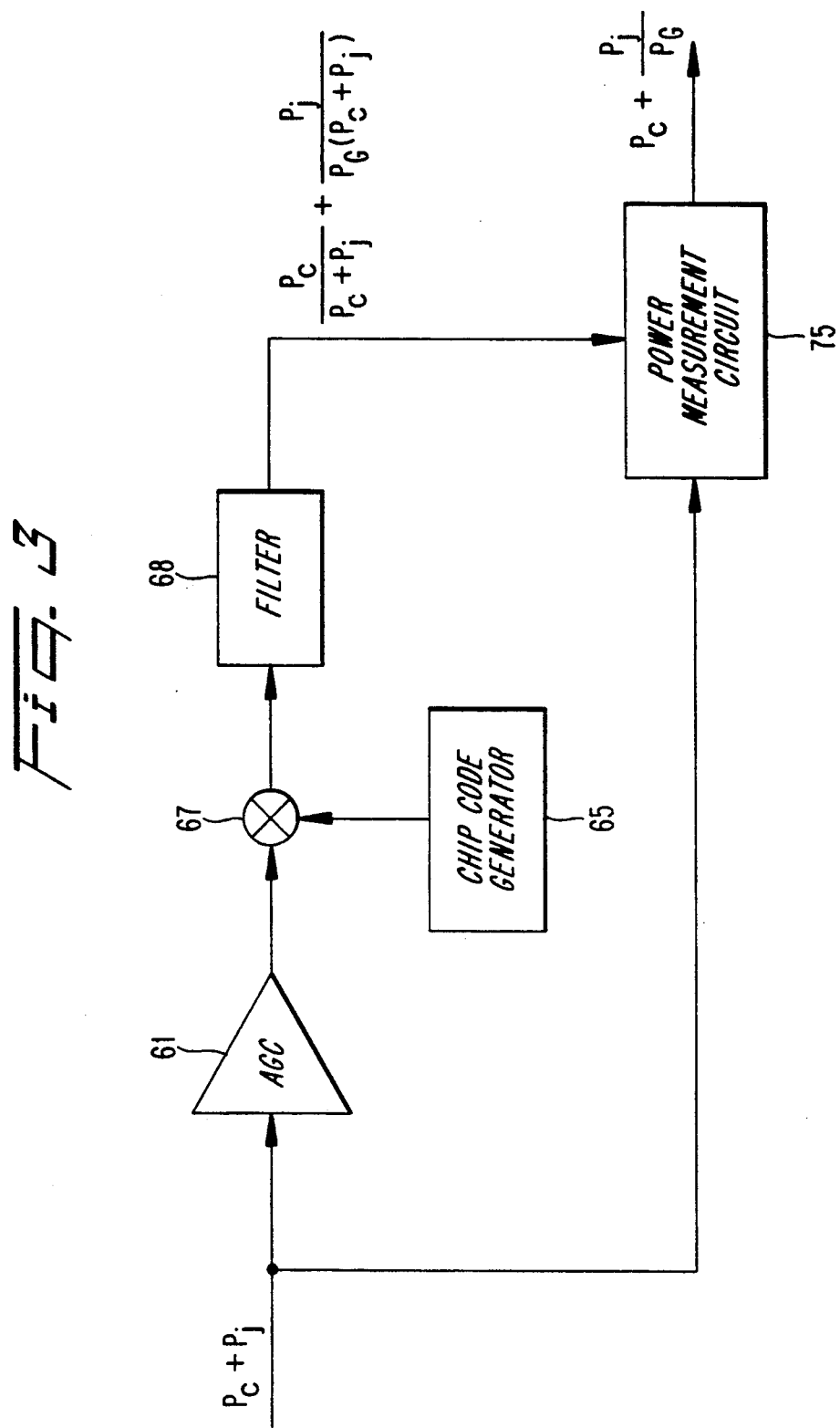

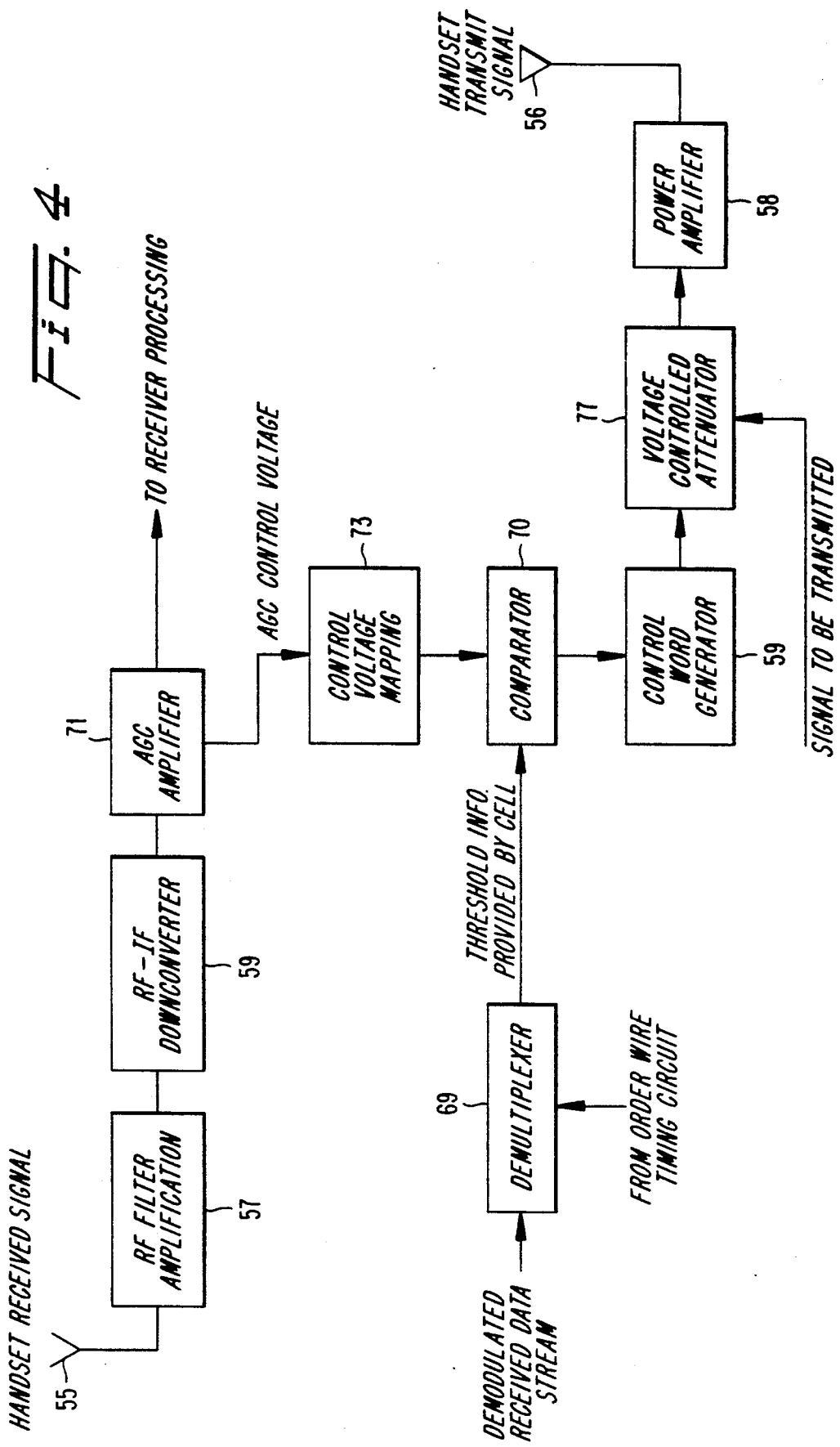

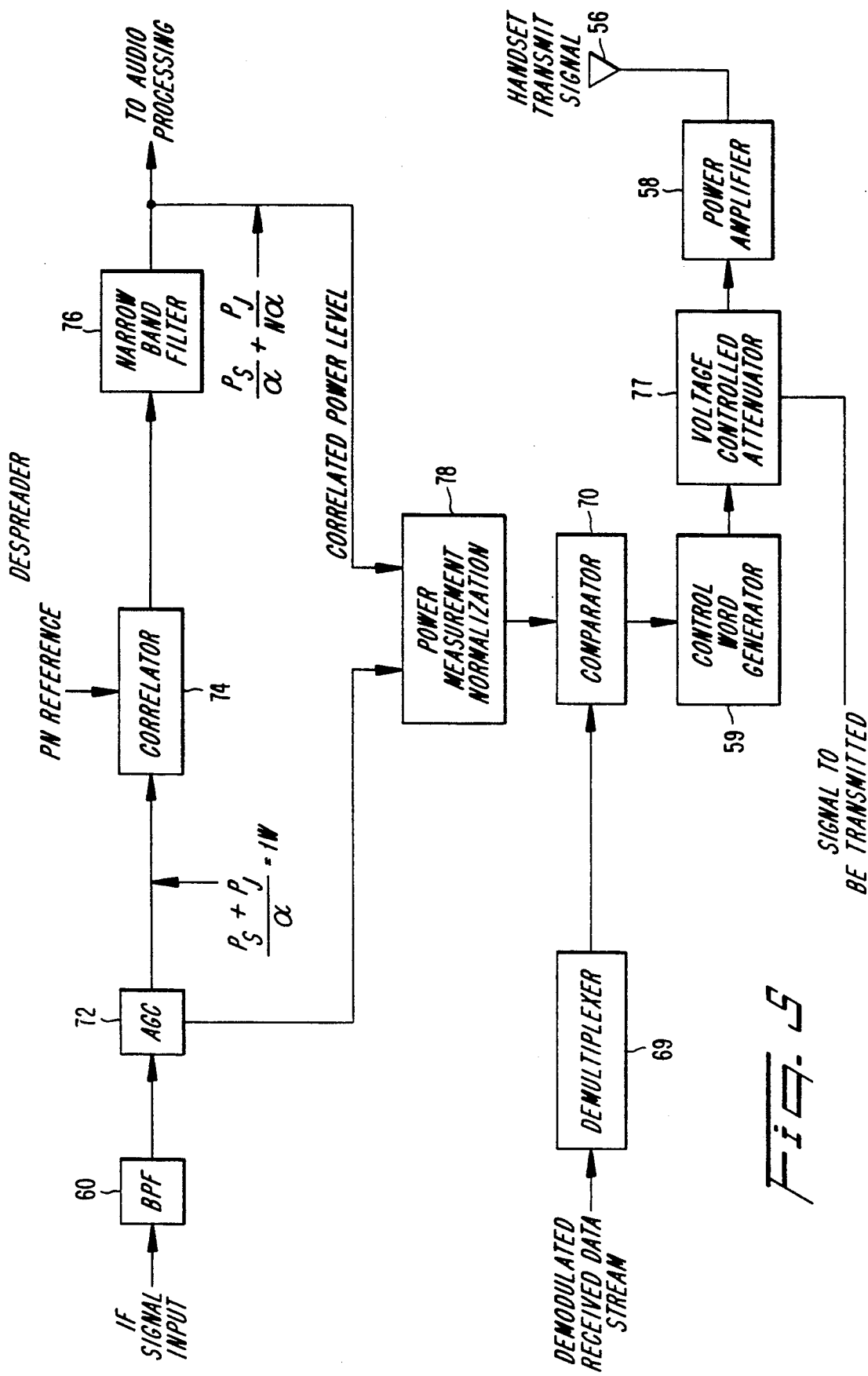

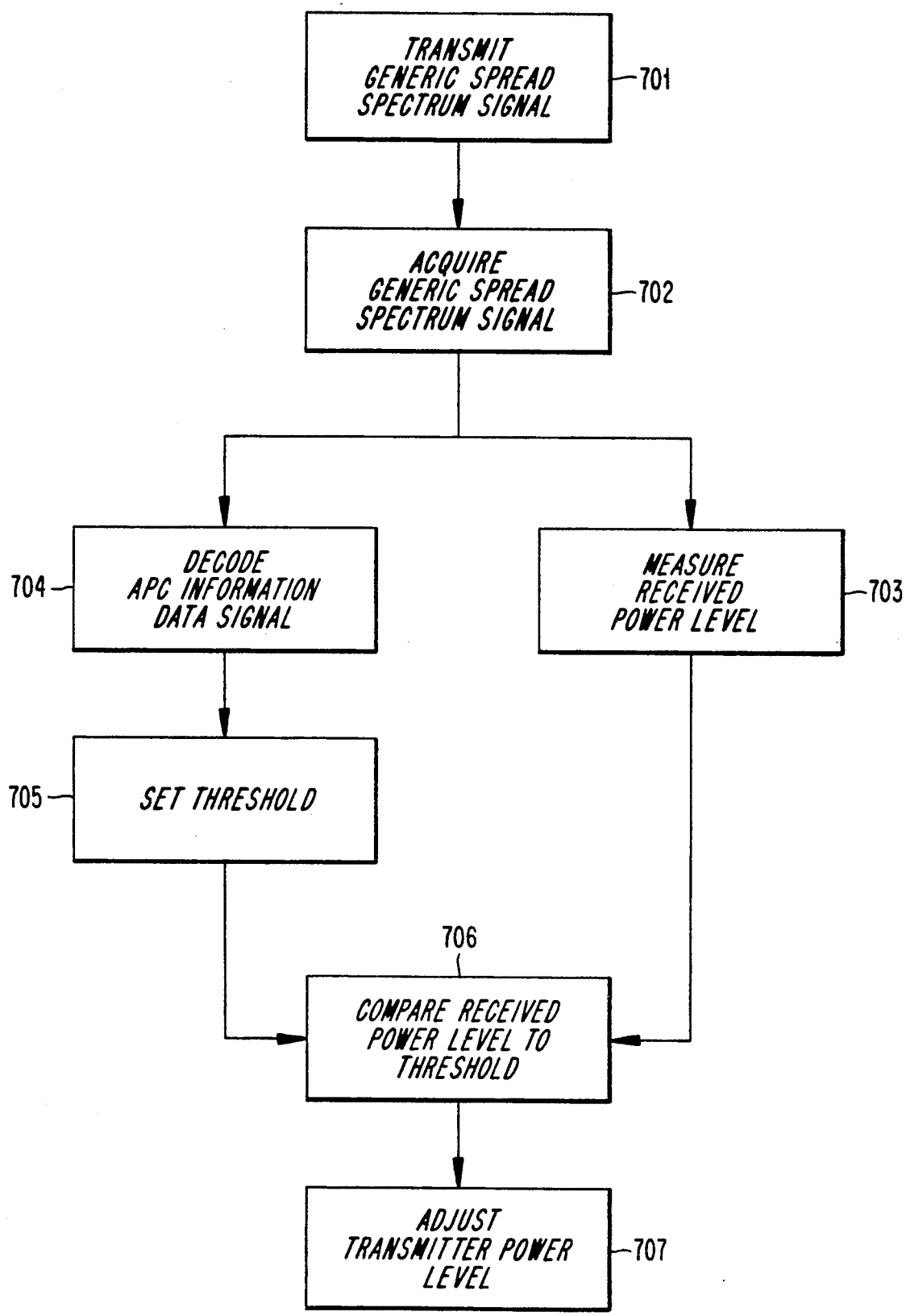

ADAPTIVE POWER CONTROL FOR A SPREAD SPECTRUM COMMUNICATIONS SYSTEM AND METHOD

RELATED PATENTS

This patent is a continuation-in-part of a patent application entitled, ADAPTIVE POWER CONTROL FOR A SPREAD SPECTRUM TRANSMITTER, having Ser. No. 07/614,816, filing date of Nov. 16, 1990, now U.S. Pat. No. 5,093,840, having issue date Mar. 3, 1992.

BACKGROUND OF THE INVENTION

This invention relates to spread-spectrum communications, and more particularly to an apparatus and method for adaptive power control of a spread-spectrum signal in a cellular, personal communications environment.

DESCRIPTION OF THE RELEVANT ART

A spread-spectrum signal typically is generated by modulating an information-data signal with a chip-code signal. The information-data signal may come from a data device such as a computer, or an analog device which outputs an analog signal which has been digitized to an information-data signal, such as voice or video. The chip-code signal is generated by a chip-code where the time duration, $T_c$, of each chip is substantially less than a data bit or data symbol.

Spread-spectrum modulation provides means for communicating in which a spread-spectrum signal occupies a bandwidth in excess of the minimum bandwidth necessary to send the same information. The band spread is accomplished using a chip code which is independent of an information-data signal. A synchronized reception with the chip-code at a receiver is used for despreading the spread-spectrum signal and subsequent recovery of data from the spread-spectrum signal.

Spread-spectrum modulation offer many advantages as a communications system for an office or urban environment. These advantages include reducing intentional and unintentional interference, combating multipath problems, and providing multiple access to a communications system shared by multiple users. Commercially, these applications include, but are not limited to, local area networks for computers and personal communications networks for telephone, as well as other data applications.

A cellular communications network using spread-spectrum modulation for communicating between a base station and a multiplicity of users, requires control of the power level of a particular mobile user station. Within a particular cell, a mobile station near the base station of the cell may be required to transmit with a power level less than that when the mobile station is near an outer perimeter of the cell. This is done to ensure a constant power level at the base station, received from each mobile station.

In a first geographical region, such as an urban environment, the cellular architecture within the first geographical region may have small cells which are close to each other, requiring a low power level from each mobile user. In a second geographical region, such as a rural environment, the cellular architecture within the region may have large cells which are spread apart, requiring a relatively high power level from each mobile user. A mobile user who moves from the first geographical region to the second geographical region must adjust the power level of his transmitter, for meeting the requirements of a particular geographic region. Otherwise, if the mobile user travels from a sparsely populated region with fewer spread out cells using the relatively higher power level with his spread-spectrum transmitter, to a densely populated region with many cells without reducing the power level of his spread-spectrum transmitter, his spread-spectrum transmitter may cause undesirable interference within the cell in which he is located and/or to adjacent cells.

Accordingly, there is a need to have a spread-spectrum apparatus and method for automatically controlling a mobile user's spread-spectrum transmitter power level when operating in a cellular communications network.

OBJECTS OF THE INVENTION

A general object of the invention is an apparatus and method which results in maximization of user density within a cell domain while minimizing mobile user transmitted power.

An object of the invention is to provide an apparatus and method which controls the power level of a mobile station so that the power level received at the base station of each cell is the same for each mobile station.

Another object of the invention is to provide an apparatus and method for automatically and adaptively controlling the power level of a mobile user in a cellular communications network.

Another object of the invention is to provide a spread-spectrum apparatus and method which allows operating a spread-spectrum transmitter in different geographic regions, wherein each geographic region has a multiplicity of cells, and cells within a geographic region may have different size cells and transmitter power requirements.

A further object of the invention is a spread-spectrum apparatus and method which allows a large number of mobile users to interactively operate in a mobile cellular environment having different size cells and transmitter power requirements.

A still further object of the invention is a spread-spectrum apparatus and method which controls the power level of a mobile user in a cellular communications network using a simple circuit.

An additional further object of the invention is a spread spectrum apparatus and method which controls the power level of a mobile user even when the mobile user's receiver receives interference from a intentional or unintentional jammer.

An additional object of the invention is an apparatus and method for automatically controlling a power level of a mobile user which is easy to implement.

SUMMARY OF THE INVENTION

According to the present invention, as embodied and broadly described herein, an apparatus for adaptive-power control (APC) of a spread-spectrum transmitter is provided. A plurality of mobile stations operate in a cellular-communications network using spread-spectrum modulation. A base station transmits a first spread-spectrum signal and an APC-data signal. The APC-data signal may be transmitted with or separate from the first spread-spectrum signal.

Each mobile station includes AGC means, correlator means, power means, comparator means, transmitter means, an antenna, variable-gain means, and optionally decoder means. The correlator means is coupled to the AGC means. The power means is coupled to the AGC means and to the correlator means. The comparator means is coupled to the power means and the decoder means. The antenna is coupled to the transmitter means. The variable-gain means is coupled to the comparator means and between the transmitter means and the antenna.

A received signal is defined herein to include the first spread-spectrum signal and any interfering signal. The interfering signal is defined herein to include any noise and/or signals which are coexistent in frequency with the first spread-spectrum signal.

The decoder means decodes the APC-data signal from the first spread-spectrum signal as a threshold level. For each received signal, the AGC means generates an AGC-output signal. The correlator means despreads the AGC-output signal. The power means processes the received signal with the despread AGC-output signal for generating a received-power level. The comparator means generates a comparison signal by comparing the received-power level to the threshold level. The comparison signal may be an analog or digital data signal. The transmitter means at the mobile station transmits a second spread-spectrum signal. The variable-gain means uses the comparison signal as a basis for adjusting a transmitter-power level of the second spread-spectrum signal transmitted from the transmitter means.

The present invention also includes a method for automatic-power control of a spread-spectrum transmitter for a mobile station operating in a cellular-communications network using spread-spectrum modulation. A base station transmits a first spread-spectrum signal and an APC-data signal. The APC-data signal typically is a spread-spectrum signal. Each mobile station performs the steps of acquiring the first spread-spectrum signal transmitted from the base station, and detecting a received power level of the first spread-spectrum signal plus any interfering signal including noise. The steps also include decoding the APC-data signal as a threshold level, from the first spread-spectrum signal, or from a signal or channel separate from the first spread-spectrum signal. The method generates an AGC-output signal from the received signal, and despreads the AGC-output signal. The despread AGC-output signal is processed with the received signal to generate a received-power level. The method further includes comparing the received-power level to the threshold level, and adjusting a transmitter power level of a second spread-spectrum signal in response to the comparison.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 1 shows an adaptive power control receiver and transmitter according to the present invention;

FIG. 2 shows an adaptive power control receiver and transmitter according to the present invention;

FIG. 3 is a block diagram of an automatic power control circuit with interference rejection;

FIG. 4 is a block diagram of an open loop automatic power control system;

FIG. 5 is a block diagram of an open loop automatic power control system with interference rejection;

FIG. 7 is a flow chart of the method of the present invention.

DETAILED DESCRIPTION OF THE PREFERRED EMBODIMENTS

Figure 6:
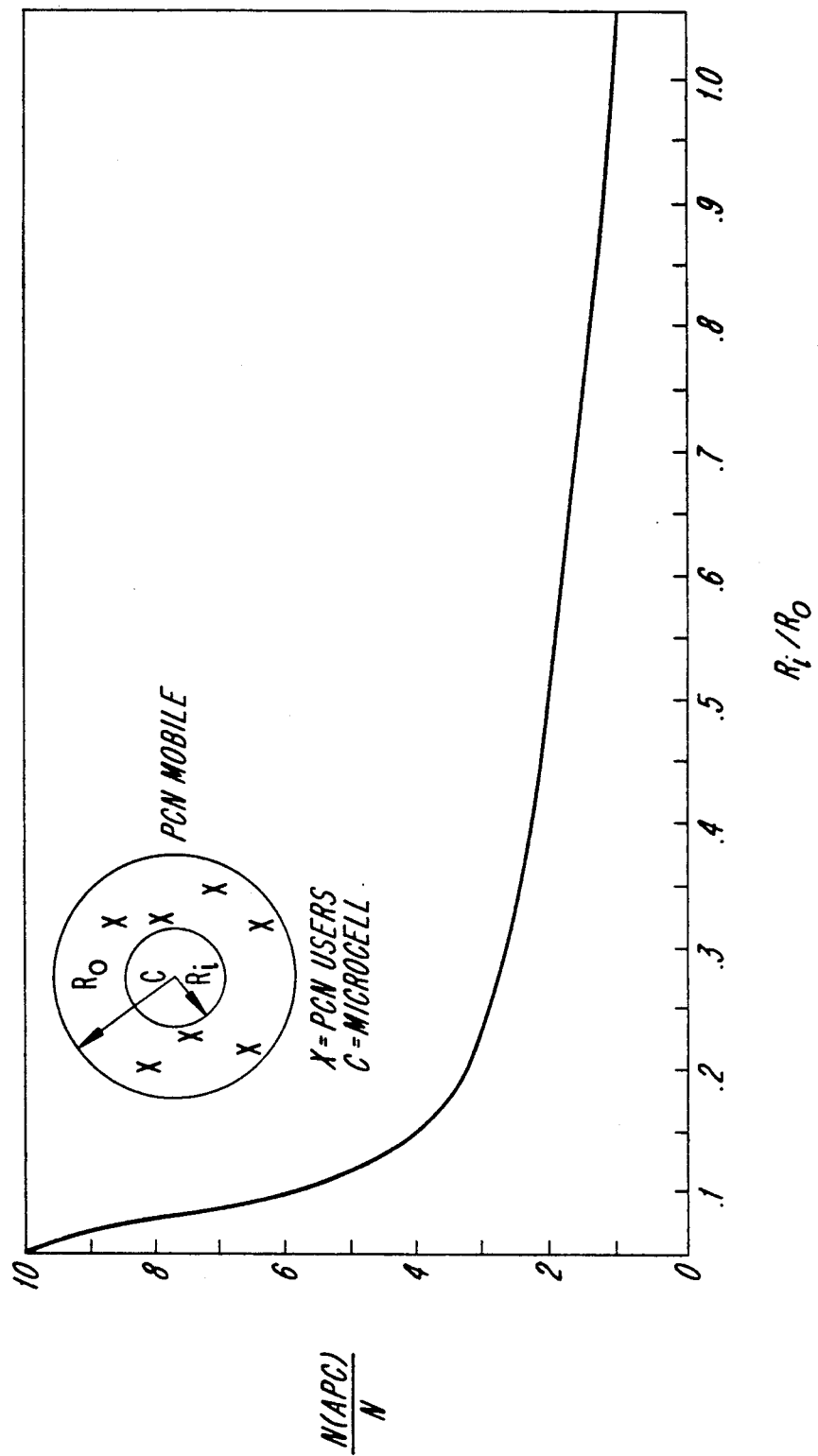
FIG. 6 shows the relative effect of a multiplicity of users communicating with spread-spectrum in a cellular environment with and without using adaptive power control.

Reference will now be made in detail to the present preferred embodiments of the invention, examples of which are illustrated in the accompanying drawings, wherein like reference numerals indicate like elements throughout the several views.

The present invention assumes that a plurality of mobile stations operate in a cellular-communications network using spread-spectrum modulation. The cellular communications network has a plurality of geographical regions, with a multiplicity of cells within a geographical region. The size of the cells in a first geographical region may differ from the size of the cells in a second geographical region. In a first geographical region such as an urban environment, a cellular architecture within the region may have a large number of cells of small area which are close to each other. In a second geographical region such as a rural environment, a cellular architecture within the region may have cells of larger area.

A mobile station while in the first geographical region may be required to transmit a lower power level than while in the second geographical region. This requirement might be due to a decreased range of the mobile station from the base station. Within a particular cell, a mobile station near the base station of the cell may be required to transmit with a power level less than that when the mobile station is near an outer perimeter of the cell. This is done to ensure a constant power level at the base station, received from each mobile station.

In the present invention, a base station within a particular cell transmits a first spread-spectrum signal and optionally an APC-data signal. The APC-data signal may be transmitted as part of the first spread-spectrum signal, on a separate spread-spectrum channel, or as a totally separate signal. The APC-data signal includes information on the threshold level each mobile station is to use when communicating with the base station. If an APC-data signal were not used, then the threshold level may be fixed at a preset level for each mobile station communicating with the base station.

The APC-data signal may be transmitted with or separate from the first spread-spectrum signal. For example, a spread-spectrum signal using a first chip codeword may be considered a first spread-spectrum channel having the first spread-spectrum signal, and a spread-spectrum signal using a second chip codeword may be considered a second spread-spectrum channel. The APC-data signal may be transmitted in the same spread-spectrum channel, i.e. the first spread-spectrum channel, as the first spread-spectrum signal, or in a second spread-spectrum channel which is different from the first spread-spectrum signal.

In the exemplary arrangement shown in FIG. 1, an apparatus for adaptive-power control of a spread-spectrum transmitter is provided. Each mobile station comprises correlator means, detector means, decoder means, comparator means, transmitter means, an antenna, and first variable-gain means. The apparatus, by way of example, may have the correlator means embodied as a first product device 101, a first chip-code generator 102, and a bandpass filter 103. Alternatively, the correlator means may be realized as a matched filter such as a surface-acoustic-wave device. In general, the correlator means uses or is matched to the chip codeword of the spread-spectrum signal being received.

The detector means may be embodied as envelope detector 104. Other type detectors may be used with the present invention, such as square law detectors or coherent detectors, as is well known in the art. The decoder means may be embodied as decoder 105. The comparator means may be embodied as differential amplifier 106, the transmitter means as transmitter 112 and the first variable gain means as first variable-gain device 111. The first variable-gain device 111 may be a variable-gain amplifier, a variable-gain attenuator or any device which performs the same function as the first variable-gain device 11 and described herein.

The first product device 101 is coupled to the first chip-code generator 102 and to the bandpass filter 103. The envelope detector 104 is coupled between the bandpass filter 103 and the differential amplifier 106. The decoder 105 is coupled between the bandpass filter 103 and the differential amplifier 106. The decoder 105 alternatively may be coupled to the output of the envelope detector 104. The variable-gain device 111 is coupled to the differential amplifier 106 and between the transmitter 112 and antenna.

The decoder 105, as illustratively shown in FIG. 2, alternatively may be coupled between a second bandpass filter 203 and differential amplifier 106. In this particular embodiment, the second bandpass filter 203 is coupled to a second product device 201. The second product device 201 is connected to a second chip-code generator 202. The embodiment of FIG. 2 could be used where the APC-data signal is transmitted over the second spread-spectrum channel simultaneously while the first spread-spectrum signal is transmitted over the first spread-spectrum channel. The second channel uses a spread-spectrum signal with a second chip code, and the second chip-code generator 202 generates a second chip-code signal using the second chip code.

The product device 101, FIGS. 1 or 2, using a first chip-code signal from the first chip-code generator 102 acquires the first spread-spectrum signal transmitted from the base station. The first chip-code signal has the same chip code as the first spread-spectrum signal. The envelope detector 104 detects a received power level of the first spread-spectrum signal. The received power level may be measured at the detector.

The decoder 105 decodes the APC-data signal from the first spread-spectrum signal as a threshold level. More particularly, data which establishes or sets the threshold level for differential amplifier 106 is sent with the APC-data signal.

The differential amplifier 106 generates a comparison signal by comparing the received power level of the first spread-spectrum signal to the threshold level. The differential amplifier 106 may employ a differential amplifier or other circuits for performing the comparison function. The transmitter 112 transmits a second spread-spectrum signal. The variable-gain device 111 using the comparison signal, adjusts a transmitter-power level of the second spread-spectrum signal from the transmitter. The variable-gain device 111 may be realized with a variable-gain amplifier, a variable-gain attenuator, or an equivalent device which can adjust the power level of the second spread-spectrum signal.

As illustratively shown in FIG. 3, a block diagram of a power measurement circuit with interference rejection is shown for use with a mobile station. A correlator is shown with the mixer 71 coupled between the chip-code generator 7 and filter 72. Additionally, AGC means and power means are included. The AGC means is embodied as an automatic-gain-control (AGC) circuit 74, and the power means is embodied as a power measurement circuit 75. As shown in FIG. 3, the AGC circuit 74 is connected to the mixer 71, and the output of the filter 72 is connected to the power measurement circuit 75. Additionally, the input to the AGC circuit 74 is connected to the power measurement circuit 75.

A received signal includes a first spread-spectrum signal with power $P_C$ and an interfering signal with power $P_J$ at the input to the circuit of FIG. 3. The interfering signal may come from one or more nondesirable signals, noise, multipath signals, and any other source which would serve as an interfering signal to the first spread-spectrum signal. The received signal is normalized by the AGC circuit 74. Thus, by way of example, the AGC circuit 74 can have the power output, $P_C + P_J = 1$. The normalized received signal is despread by the correlator, which in this case is shown by way of example the mixer 71, chip-code generator 73 and filter 72. The chip-code generator 73 generates a chip-code signal using the same chip-codeword as the first spread-spectrum signal. The despread signal is filtered by filter 72, and the output of the filter is the normalized power of the first spread-spectrum signal plus the normalized power of the interfering signal divided by the processing gain, $P_G$, of the spread-spectrum system. The power measurement circuit 75 can process the despread-received signal with the received signal and output the received-power level of the first spread-spectrum signal. The power level of the interfering signal is reduced by the processing gain, $P_G$.

The power measurement circuit 75 can process the received signal with the despread, normalized received signal by multiplying the two signals together, or by logarithmicly processing the received signal with the despread received signal. In the latter case, the logarithm is taken of the power of the received signal, $P_C + P_J$, and the logarithm is taken of the despread, normalized received signal. The two logarithms are added together to produce the received-power level.

A key element for the present invention to work is the circuitry of FIG. 3. FIG. 3 shows a way for determining at the mobile station the power of the first spread-spectrum signal when it is mixed with noise. If the circuitry of FIG. 3 were not used, then it is possible that the interfering signal, which may include noise, multipath signals, and other undesirable signals, may raise the power level measured at the input to the receiver of the remote station, giving an undesirable power level. The undesirable power level measured may cause the remote station to transmit more power than required, increasing the amount of power received at the base station 50.

FIG. 4 shows a block diagram of an open loop automatic power control processing unit, where the comparator receives the threshold level information provided by the cell. More particularly, antenna 55 is coupled to an RF filter 57. An intermediate frequency (IF) down-converter 59 is coupled between the RF filter 57 and an AGC amplifier 71. The output of the AGC amplifier 71 is passed to receiver processing.

The AGC amplifier 71 can have its output or a voltage level used as an AGC-control voltage. A control-voltage mapping 73 is coupled between the AGC amplifier 71 and a comparator 70. The comparator 70 is coupled to the demultiplexer 69 and to a control-word generator 59. A voltage-controlled amplifier 77 is coupled to the control-word generator 59, transmitter and power amplifier 58. The power amplifier 58 is coupled to an antenna 56.

In FIG. 4, a received spread-spectrum signal from antenna 55 is bandpass filtered by RF filter 57 and converted to an IF by down-converter 59. The AGC amplifier normalized the voltage of the received spread-spectrum signal, and also generates an AGC-control voltage. The control-voltage mapping 73 maps the AGC-control voltage for comparator 70. The comparator 70 compared the mapped-AGC-control voltage to a threshold level, which is provided by demultiplexer 69.

The comparison signal generated by comparator 70 is converted by control word generator 59 to control voltage-controlled attenuator 77. Accordingly, the voltage-controlled attenuator 77 adjusts the power level from the transmitter and inputted to power amplifier 58 and radiated by antenna 56.

FIG. 5 illustrates the open loop automatic power control circuit of FIG. 4, with the concepts from FIG. 3 added thereto. Shown in FIG. 5 are power means, comparator means, transmitter means, an antenna, variable-gain means and decoder means. The AGC means is shown as an automatic-gain-control (AGC) amplifier 72, correlator means is shown as correlator 74 with filter 76, and power means is shown as power measurement device 78. The comparator means is shown as comparator 70, the transmitter means is shown as power amplifier 58 coupled to the antenna 56. The variable gain means is embodied as voltage controlled attenuator 77 and the decoder means is illustrated as demultiplexer 69. Also illustrated is a control word generator 59 coupled between comparator 70 and voltage controlled attenuator 77.

The AGC amplifier 72 is coupled between the bandpass filter 60 and the correlator 74. The filter 76 is coupled to the output of the correlator 74. The power measurement device 78 is coupled to the AGC amplifier 72 and the filter 76. The comparator 70 is coupled to the output of the power measurement device 78 and to the demultiplexer 69. The control word generator 59 is coupled between the comparator 70 and the voltage controlled attenuator 77. The power amplifier 58 is coupled to the output of the voltage controlled attenuator 77 and the antenna 56.

The demultiplexer 69 decodes the APC-data signal, which is received with the first spread-spectrum signal, as a threshold level. The threshold level is used by the comparator 70 as a comparison for the received-power level measured by the power measurement device 78.

For each received signal, the AGC amplifier 72 generates an AGC-output signal. The AGC-output signal is despread using correlator 74 and filter 76. The despread-AGC-output signal from the filter 76 is processed with the received signal from the AGC amplifier 72, by the power measurement device 78. The received signal to the power measurement device 78 may be a AGC-control-voltage level from the AGC amplifier 72.

The power measurement device 78 processes the received signal with the despread-AGC-output signal, for generating a received-power level. As mentioned previously for FIG. 3, the power measurement device 78 can process the received signal with the despread-AGC-output signal by multiplying the two signals together, or by logarithmicly processing the received signal with the despread-AGC-output signal.

The comparator 70 generates a comparison signal by comparing the received-power level generated by the power measurement device 78, to the threshold level provided by the demultiplexer 69. The comparison signal may be an analog or digital data signal. Broadly, the control word generator 59 can convert the comparison signal to a digital data signal for controlling the voltage controlled attentuator 77. The voltage controlled attenuator 77 uses the comparison signal, as processed by the control word generator 59, as a basis for adjusting a transmitter-power level of a second spread-spectrum signal transmitted by the power amplifier 58, and radiated by the antenna 56.

In operation, a base station in a cell may transmit the first spread-spectrum signal on a continuous basis or on a repetitive periodic basis. Mobile stations within the cell receive the first spread-spectrum signal. The received first spread-spectrum signal is acquired and despread with the first chip-code signal from first chip-code generator 102 and first product device 101. The despread first spread-spectrum signal is filtered through bandpass filter 103. The mobile station detects the despread first spread-spectrum signal using envelope detector 104, and measures the received power level of the first spread-spectrum signal.

The APC-data signal may be transmitted on the same channel as the first spread-spectrum signal using the same chip codeword as the first spread-spectrum signal. In this case, the APC-data signal is transmitted at a different time interval from when the first spread-spectrum signal is transmitted. This format allows the mobile station to acquire synchronization with the first chip-code, using the first spread-spectrum signal.

As an alternative, the APC-data signal may be transmitted on a different coded channel using a second chip codeword. In the latter case, the second spread-spectrum signal having the APC-data signal would be acquired by the second chip-code generator 202 and second product device 201. In either case, the APC-data signal is decoded using decoder 5. Further, the APC-data signal may be time division multiplexed or frequency division multiplexed with the first spread-spectrum signal.

The decoder 105 decodes from the APC-data signal the value of the threshold level for use by differential amplifier 106. For example, if there were eight levels for which to set the threshold level, then at minimum, a three bit word may be used with the APC-data signal to transmit the threshold level to the mobile station. The threshold level is used to adjust and or set the threshold of the differential amplifier 106. Accordingly, the received power level from envelope detector 104 is compared to the threshold of the differential amplifier 106.

If the received power level is greater than the threshold level, then the first variable-gain device 111 would decrement or decrease the second spread-spectrum power level. If the received power level is less than the threshold at differential amplifier 106, then the first variable-gain device 111 increases the second spread-spectrum power.

The APC circuit 110 of FIGS. 1 and 2 may be built on a digital signal processor (DSP) chip. An analog to digital converter located at the output of the bandpass filter 103 would convert the received signal to a data signal. The envelope detector 104, decoder 105 and differential amplifier 106 may be implemented as part of digital signal processing functions on the DSP chip. The analog to digital converters may be included on the DSP chip.

FIG. 7 shows the advantage of using an adaptive power control apparatus with a mobile station in a personal communications network. The number of adaptive power control mobile stations, N(APC), versus the number of mobile stations which can be used in a similar region, N, is plotted with respect to an inner radius, $R_i$, and an outer radius, $R_o$. When the inner radius goes to zero, using spread-spectrum as code division multiplex, the number of users with adaptive power control who can operate within a cell, is approximately ten times the number of users without adaptive power control who can operate within the cell.

The present invention also includes a method for automatic-power control of a spread-spectrum transmitter for a mobile station operating in a cellular-communications network using spread-spectrum modulation. Referring to FIG. 8, a base station transmits 701 a first spread-spectrum signal and optionally an APC information-data signal. Each mobile base station performs the steps of acquiring 702 the first spread-spectrum signal transmitted from the base station, and detecting 703 a received power level of the first spread-spectrum signal. The steps also include decoding 704 the APC-data signal as a threshold level, from the first spread-spectrum signal, or from a separate signal from the first spread-spectrum signal. A threshold level is set 705 from the APC-data signal. A preset threshold level may be employed if the APC-data signal is not used. The method further includes comparing 706 the received power level to the threshold level, and adjusting 707 a transmitter power level of a second spread-spectrum signal in response to the comparison.

The method may additionally include generating from a received signal an AGC-output signal, and despreading the AGC-output signal. The received signal includes the first spread-spectrum signal and an interfering signal. The received signal is processed with the despread AGC-output signal to generate a received-power level. The method then generates a comparison signal by comparing the received-power level to the threshold level. While transmitting a second spread-spectrum signal, the method adjusts a transmitter-power level of the second spread-spectrum signal from the transmitter using the comparison signal.

It will be apparent to those skilled in the art that various modifications can be made to the method and apparatus for adaptively controlling a power level of a spread-spectrum signal in a cellular environment of the instant invention without departing from the scope or spirit of the invention, and it is intended that the present invention cover modifications and variations of the method and apparatus for adaptively controlling a power level of a spread-spectrum signal in a cellular environment provided they come in the scope of the appended claims and their equivalents.

I claim:

1. An apparatus for adaptive-power control of a spread-spectrum transmitter of a mobile station operating in a cellular-communications network using spread-spectrum modulation, wherein a base station transmits a first spread-spectrum signal, said mobile station comprising:

AGC means responsive to a received signal, wherein the received signal includes the first spread-spectrum signal and an interfering signal, for generating an AGC-output signal;

correlator means for despreading the AGC-output signal;

power means responsive to processing the received signal with the despread AGC-output signal, wherein said power means includes means for multiplying the received signal with the depread AGC-output signal, for generating a received-power level;

comparator means for generating a comparison signal by comparing the received-power level to a threshold level;

transmitter means for transmitting a second spread-spectrum signal;

an antenna; and variable-gain means responsive to said comparison signal for adjusting a transmitter-power level of the second spread-spectrum signal from said transmitter means.

2. An apparatus for adaptive-power control of a spread-spectrum transmitter of a mobile station operating in a cellular-communications network using spread-spectrum modulation, wherein a base station transmits a first spread-spectrum signal, said mobile station comprising:

AGC means responsive to a received signal, wherein the received signal includes the first spread-spectrum signal and an interfering signal, for generating an AGC-output signal;

correlator means for despreading the AGC-output signal;

power means responsive to processing the received signal with the despread AGC-output signal, wherein said power means includes logarithmic means for adding the received signal with the depread AGC-output signal, for generating a received power level;

comparator means for generating a comparison signal by comparing the received-power level to a threshold level;

transmitter means for transmitting a second spread-spectrum signal;

an antenna; and variable-gain means responsive to said comparison signal for adjusting a transmitter-power level of the second spread-spectrum signal from said transmitter means.

3. An apparatus for determining a received-power level of a spread-spectrum signal, when a received signal includes the spread-spectrum signal and an interfering signal, comprising:

AGC means responsive to the received signal for generating an AGC-output signal;

correlator means, including a differential amplifier, for despreading the AGC-output signal; and power means responsive to processing the received signal with the despread AGC-output signal, wherein said power means includes means for multiplying the received signal with the despread AGC-output signal, for generating a received-power level.

4. An apparatus for determining a received-power level of a spread-spectrum signal, when a received signal includes the spread-spectrum signal and an interfering signal, comprising:
   AGC means responsive to the received signal for generating an AGC-output signal;
   correlator means, including a differential amplifier, for despreading the AGC-output signal; and
   power means responsive to processing the received signal with the despread AGC-output signal, wherein said power means includes logarithmic means for adding the received signal with the despread AGC-output signal, for generating a received-power level.

5. An apparatus for adaptive-power control of a spread-spectrum transmitter of a mobile station operating in a cellular-communications network using spread-spectrum modulation, wherein a base station transmits a first spread-spectrum signal and an APC-data signal, said mobile station comprising:
   decoder means for decoding the APC-data signal as a threshold level;
   AGC means responsive to a received signal, wherein the received signal includes the first spread-spectrum signal and an interfering signal, for generating an AGC-output signal;
   correlator means for despreading the AGC-output signal;
   power means responsive to processing the received signal with the despread AGC-output signal, wherein said power means includes means for multiplying the received signal with the despread AGC-output signal, for generating a received-power level;
   comparator means for generating a comparison signal by comparing the received-power level to said threshold level;
   transmitter means for transmitting a second spread-spectrum signal;
   an antenna; and
   variable-gain means responsive to said comparison signal for adjusting a transmitter-power level of the second spread-spectrum signal from said transmitter means.

6. An apparatus for adaptive-power control of a spread-spectrum transmitter of a mobile station operating in a cellular-communications network using spread-spectrum modulation, wherein a base station transmits a first spread-spectrum signal and an APC-data signal, said mobile station comprising:
   decoder means for decoding the APC-data signal as a threshold level;
   AGC means responsive to a received signal, wherein the received signal includes the first spread-spectrum signal and an interfering signal, for generating an AGC-output signal;
   correlator means for despreading the AGC-output signal;
   power means responsive to processing the received signal with the despread AGC-output signal, wherein said power means includes logarithmic means for adding the received signal with the despread AGC-output signal, for generating a received-power level;
   comparator means for generating a comparison signal by comparing the received-power level to said threshold level;
   transmitter means for transmitting a second spread-spectrum signal;
   an antenna; and
   variable-gain means responsive to said comparison signal for adjusting a transmitter-power level of the second spread-spectrum signal from said transmitter means.

7. An apparatus for determining a received-power level of a spread-spectrum signal, when a received signal includes the spread-spectrum signal and an interfering signal, comprising:
   AGC means responsive to the received signal for generating an AGC-output signal;
   correlator means for despreading the AGC-output signal; and
   power means responsive to processing the received signal with the despread AGC-output signal, wherein said power means includes means for multiplying the received signal with the despread AGC-output signal, for generating a received-power level.

8. An apparatus for determining a received-power level of a spread-spectrum signal, when a received signal includes the spread-spectrum signal and an interfering signal, comprising:
   AGC means responsive to the received signal for generating an AGC-output signal;
   correlator means for despreading the AGC-output signal; and
   power means responsive to processing the received signal with the despread AGC-output signal, wherein said power means includes logarithmic means for adding the received signal with the despread AGC-output signal, for generating a received-power level.

* * * * *

UNITED STATES PATENT AND TRADEMARK OFFICE
CERTIFICATE OF CORRECTION

PATENT NO.  : 5,299,226
DATED       : March 29, 1994
INVENTOR(S) : Donald L. Schilling It is certified that error appears in the above-identified patent and that said Letters Patent is hereby corrected as shown below:

Column 6, line 14: delete "7" and insert --73--.

Column 8, line 52: delete "5" and insert --105--.

Signed and Sealed this

Eleventh Day of July, 1995

Attest:

BRUCE LEHMAN

*Attesting Officer*  *Commissioner of Patents and Trademarks*